(12) United States Patent  
Newman

(10) Patent No.: US 9,498,900 B2
(45) Date of Patent: Nov. 22, 2016

(54) SYSTEMS AND METHODS FOR THE PRODUCTION OF CONTACT LENSES

(71) Applicant: MENICON SINGAPORE PTE LTD., Singapore (SG)

(72) Inventor: Stephen D. Newman, Singapore (SG)

(73) Assignee: Menicon Singapore PTE LTD., Singapore (SG)

( * ) Notice: Subject to any disclaimer, the term of this patent is extended or adjusted under 35 U.S.C. 154(b) by 0 days.

(21) Appl. No.: 14/881,001

(22) Filed: Oct. 12, 2015

(65) Prior Publication Data

US 2016/0031126 A1 Feb. 4, 2016

Related U.S. Application Data

(62) Division of application No. 13/381,301, filed as application No. PCT/JP2010/004475 on Jul. 9, 2010, now Pat. No. 9,193,119.

(30) Foreign Application Priority Data

Jul. 10, 2009 (SG) .................................. 200904706

(51) Int. Cl.
```
B29C 35/08    (2006.01)
B29C 41/04    (2006.01)
B29D 11/00    (2006.01)
B29C 41/34    (2006.01)
```
(Continued)

(52) U.S. Cl.
CPC ......... B29C 41/042 (2013.01); B29C 35/0805 (2013.01); B29C 41/34 (2013.01); B29D 11/00471 (2013.01); B29C 2035/0827 (2013.01); B29K 2105/24 (2013.01); B29K 2905/00 (2013.01); B29K 2995/0025 (2013.01); B29K 2995/0027 (2013.01); B29L 2011/0041 (2013.01)

(58) Field of Classification Search
CPC ................... B29C 35/0894; B29D 11/00471; B29D 11/00115
See application file for complete search history.

(56) References Cited

U.S. PATENT DOCUMENTS

| 2,458,934 | A |   | 1/1949 | Everett |   |
| 3,660,545 | A | * | 5/1972 | Wichterle | B29C 41/045 264/1.38 |
| 4,076,071 | A | * | 2/1978 | Rosenkranz | B29B 13/023 165/263 |

(Continued)

FOREIGN PATENT DOCUMENTS

| CN | 1040542 A | 3/1990 |
| EP | 0341747 A2 | 11/1989 |

(Continued)

OTHER PUBLICATIONS

Search Report issued by the Australian Patent Office for Singapore Patent Application No. SG200904706-9, mailed Oct. 6, 2010.

(Continued)

Primary Examiner — Ryan Ochylski
(74) Attorney, Agent, or Firm — Holland & Hart LLP

(57) ABSTRACT

An apparatus for spin casting lenses includes a rotatable tube, the rotatable tube defining a longitudinal cavity, wherein the longitudinal cavity is configured to receive molds. According to one exemplary embodiment, the rotatable tube is made of metal and includes a plurality of apertures configured to permit the transmission of actinic radiation.

18 Claims, 19 Drawing Sheets

(51) Int. Cl.
    *B29K 105/24*      (2006.01)
    *B29L 11/00*      (2006.01)

(56) References Cited

U.S. PATENT DOCUMENTS

| | | | | |
|---|---|---|---|---|
| 4,517,138 | A * | 5/1985 | Rawlings | B29C 33/34 264/1.1 |
| 4,517,139 | A | 5/1985 | Rawlings et al. | |
| 4,568,262 | A * | 2/1986 | Feurer | B29C 33/0022 219/700 |
| 4,568,501 | A * | 2/1986 | Wichterle | B29C 33/34 264/2.1 |
| 4,609,337 | A * | 9/1986 | Wichterle | B29C 33/34 264/2.1 |
| 4,732,714 | A * | 3/1988 | Wichterle | B29D 11/00115 264/1.36 |
| 5,034,166 | A * | 7/1991 | Rawlings | B29C 37/0032 264/1.7 |
| 5,762,081 | A | 6/1998 | Keene et al. | |

FOREIGN PATENT DOCUMENTS

| | | |
|---|---|---|
| JP | S6127217 A | 2/1986 |
| JP | 2002093724 A | 3/2002 |
| JP | 2004119786 A | 4/2004 |
| JP | 2007313643 A | 12/2007 |
| WO | 9809754 A1 | 3/1998 |
| WO | 0223596 A1 | 3/2002 |

OTHER PUBLICATIONS

PCT International Search Report for International Patent Application No. PCT/JP2010/004475, mailed Aug. 3, 2010.

English translation of Chinese Search Report for corresponding Chinese Patent Application No. 201080031153.2, dated Sep. 22, 2013.

English translation of Japanese Office Action issued Jul. 22, 2014 for corresponding Japanese Patent Application No. 2012-519143.

Search Report issued by the Intellectual Property Office of Singapore for Singapore Patent Application No. 2014014658, mailed Mar. 16, 2016.

\* cited by examiner

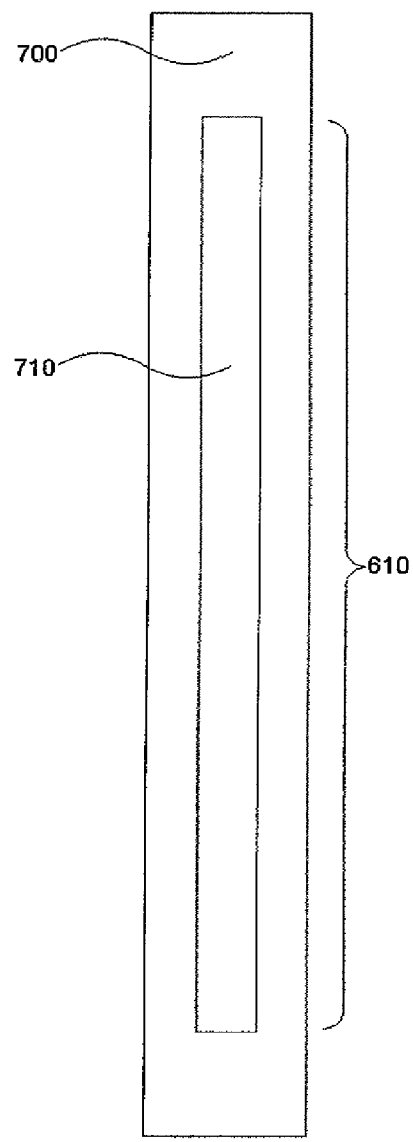

SYSTEMS AND METHODS FOR THE PRODUCTION OF CONTACT LENSES

RELATED APPLICATIONS

The present application is a divisional of U.S. patent application Ser. No. 13/381,301, filed on 13 Feb. 2012 and titled "Systems and methods for the Production of Contact Lenses," which application claims priority to PCT application number PCT/JP2010/004475, filed on 9 Jul. 2010, titled "Systems and Methods for the Production of Contact Lenses." These applications are incorporated herein by reference in their entireties.

BACKGROUND ART

In recent decades, contact lenses have become a preferential alternative to other eyesight correction methods. Due to their increased popularity, it has become mandatory that contact lenses be manufactured on a large scale in order to meet consumer demand. Further, these lenses are required to be precision manufactured with low tolerances in order to provide a suitable and effective corrective lens.

Spin casting has been utilized as a method of producing contact lenses. However, traditional spin casting methods are disadvantageous for several reasons as will be discussed below, and have not readily been employed in the mass-production of contact lenses.

To begin, the polymerization casting of axially symmetrical articles, such as contact lenses, may be performed by using a spin casting process. In this process, a controlled quantity of a polymerizable liquid is placed into an open mold, which is then rotated about its vertical axis at a rotational speed sufficient to produce a centrifugal force that causes a radially outward displacement of the polymerizable liquid. By maintaining a controlled rotation rate, the centrifugal force caused by the rotation will cause the polymerizable liquid to adopt a generally concave shape. Once the polymerizable liquid has attained an equilibrium shape, polymerization of the liquid can be effected by any suitable means, such as heat or exposure to actinic radiation (i.e. ultraviolet light) so as to produce a solid polymeric contact lens.

The open mold used in a spin casting process is typically characterized by an outer cylindrical wall and a mold comprising an exposed concave molding cavity. The shape of the molding cavity will typically define the shape of the front surface of the finished contact lens, and may contain such desired elements as lenticulating curves, toric curves, non-spherical curves and other such features or shapes aimed at interacting with the eye, its optical processes, or eyelids in a predetermined manner.

The shape factor of the posterior or back surface of the lens is determined predominantly by the angular speed of rotation, as well as other factors such as the surface tension of the polymerizable liquid, and the acceleration due to gravity.

The polymerizable liquid utilized in the spin casting process is typically one in which the polymerization reaction can be triggered by an external factor such as heat or actinic radiation (i.e. ultraviolet light), and is therefore most commonly utilized in connection with a system that undergoes a free radical polymerization reaction. Typically these systems will include a monomer, or mixture of monomers based on acrylic or methacrylic acid, along with a free radial polymerization initiator. However, pre-polymerized materials such as solvent-based materials may also be applied in a spin casting system.

To avoid the inhibiting effects of atmospheric oxygen during the polymerization process, the molds and polymerizable liquid are maintained, at least initially, in an inert gas atmosphere of, for example, nitrogen or argon. The use of an external trigger for the polymerization allows for the polymerizable liquid to attain its equilibrium shape under rotation prior to the onset of polymerization, and also to allow time for any oxygen present within the mold or dissolved in the polymerizable liquid to diffuse away from the polymerizable liquid.

During the actual mass production of contact lenses, the individual molds can be arranged in a carousel or in a vertical stack configuration. The carousel arrangement is rather complex and quite large with respect to the size of the molds. It requires that each mold be individually rotated on its own separate vertical axis. It is reported that the carousel arrangement suffers from the disadvantages of requiring excess inert gas to eliminate the inhibiting effect of oxygen (in the ambient environment) present during the polymerization reaction. The use of excess inert gas during the polymerization of the monomeric reactants causes the entrainment of monomer in the form of vapors and the subsequent deposition and/or polymerization of the monomer on the surrounding objects, and, in particular, the equipment utilized by the system. Further information is set forth in Method of Centrifugally Casting Thin Edged Corneal Contact Lenses, U.S. Pat. No. 3,660,545 to Otto Wichterle (filed Oct. 24, 1963) (issued May 2, 1972), the full disclosure of which is incorporated herein by reference in its entirety.

In the vertical stack arrangement a rotatable polymerization tube having an internal, generally circular, cross-sectional geometry is adapted to receive, at one end of the tube, a plurality of generally circular molds which become seated to one another in the tube, each mold containing the polymerizable liquid reactants in their individual mold cavities. The polymerization tube, or rotatable tube, can be manufactured so that its internal diameter generally matches the external diameter of the individual molds so as to provide an interference fit. More preferably, the rotatable tube can contain ridges or similar features so as to facilitate a multiple point contact with the individual molds. This latter arrangement allows for the molds to rotate with the rotatable tube, and also to allow for the passage of inert gas through the rotatable tube and past the individual molds. Suitable prior art designs for the rotatable tube are disclosed in Device and Method for Centrifugally Casting Articles, U.S. Pat. No. 4,517,138 to David L. Rawlings et al. (filed May 2, 1983) (issued May 14, 1985) (hereinafter "'138 patent").

One typical prior art arrangement for the production of lenses by spin casting is that taught by the '138 patent. In this design, monomer dosed molds are fed, one by one, into the top of a rotatable tube comprising two zones, a conditioning zone and a polymerization zone. Typically the rotatable tube contains a plurality of dosed molds, so that the rotatable tube is essentially full of molds. As each new mold is introduced into the rotatable tube conditioning zone, a fully cured mold is ejected from the bottom of the polymerization zone.

By this means, the number of molds within the rotatable tube remains constant, with individual molds progressing slowly through first the conditioning zone, and then the polymerization zone. This arrangement allows the polymerizable liquid within each mold to attain its equilibrium meniscus shape before entering the polymerization zone, wherein polymerization may be initiated. This arrangement, while allowing for the continuous curing of contact lenses, is not without its issues.

Predominant among these issues is line clearance. Contact lenses are produced with a range of differing parameters, most notably the sphere power. A typical power range for a contact lens offered for sale will be at least +4.00 diopters to −8.00 diopters, in 0.25 diopter steps, which represents 49 individual designs, or stock keeping units (SKU). In order to switch production from one SKU to a second SKU, it is necessary to clear all partially and fully polymerized product from the rotatable tube, since to change SKU it is necessary to either change the mold design and/or the rotational speed of the rotatable tube.

Typically this line clearance is achieved by adding mold blanks (for instance empty molds, or cylindrical plugs) into the top of the rotatable tube in place of the dosed molds, and continuing the spinning process until all the product is ejected from the polymerization zone. Once the required changes to effect the change of SKU have been completed, dosed molds can again be added one by one into the rotatable tube, with the mold blanks being ejected from the bottom of the polymerization zone until all the blanks have been cleared. This line clearance naturally can take some time, and essentially represents a period of reduced productivity.

The problems of line clearance are compounded when toric lenses are manufactured. Toric lenses are used to correct those who have an optical defect called astigmatism. Astigmatism causes blurred vision due to the inability of the optics of the eye to focus a point object into a sharp focused image on the retina. This may be due to an irregular or toric curvature of the cornea or lens. With a toric lens, a typical power range would be with sphere powers over the range +4.00 diopters to −8.00 diopters, in 0.25 diopter steps, with at least 1 cylinder power offered in at least 6 axes, representing 294 individual SKU's.

Line clearance presents further problems if a temporary line stoppage is necessary. Should a manufacturing parameter deviation create a temporary line interruption, the full line must be cleared prior to trouble shooting or restarting. The very nature of a continuous flow system dictates that molds can only be ejected or reintroduced at a standard part rate. The larger or longer the line, the longer clearance time will be required.

The problems of line clearance can be removed if the spinning process is run as a batch or semi batch process. In this process, the rotatable tube is initially filled with dosed molds in one operation. The rotatable tube is then rotated at the desired rotation speed in order to allow the polymerization mixture contained within each mold to attain its equilibrium shape. Then polymerization is initiated by exposure to a preferred means of radiation. Ultraviolet polymerization is strongly preferred in batch processing as it allows almost instantaneous switching from zero exposure to full exposure, whereas a thermal initiation would require both heat-up and cool-down periods. The overall lens production cycle in a batch spin casting process will therefore require less time, and, consequently, be more efficient when using ultraviolet polymerization.

However, in order to utilize ultraviolet initiation in spin casting, the rotatable tubes are limited to being constructed from a material transparent to the passage of ultraviolet light. Further, the material used in the construction of the rotatable tubes must not be subject to the deleterious effects of prolonged ultraviolet exposure which may cause, for example, discoloration or mechanical degradation. For this reason, most rotatable tubes are made from glass.

While glass is an efficient material for use in spin casting in terms of UV transmissibility, the spin tube must also be able to both present an accurate and straight inner bore for the molds and must spin around its own vertical axis with minimal run out of polymerizable liquid and minimal vibration within the system. To achieve these objectives utilizing a glass rotatable tube is not without its challenges. Firstly, glass is not conducive to accurate machining. In order to accurately form the inner bore of the rotatable tube, a hot blank glass rod must be drawn onto a metal former. See, e.g., Method of Forming Precision Bore Glass Tubing, U.S. Pat. No. 2,458,934 to Everett Samuel James (filed Nov. 22, 1941) (issued Jan. 11, 1949). This process is tedious and time consuming, and may produce a tube having an inner bore that contains flaws or is otherwise imprecise.

Secondly, the glass rotatable tube must be mounted accurately into bearings at the top and bottom of the tube. Typically this is achieved by grinding a taper onto either end of the tube. Once the tube has been provided with tapers, the tube may be mounted into the bearings. The bearings must also be provided with a means for adjusting the rotatable tube so that the axis of rotation is exactly along the centerline of the inner bore (i.e. to eliminate "run-out").

Further, since glass is susceptible to brittle failure, it cannot be exposed to high tensile stresses such that the bearing mountings should not exert undue compressive force, or any excess shear forces while adjusting run-out. This precludes the use of pre-loaded high-speed bearings and typically necessitates frequent tube alignment adjustments during manufacturing.

Still further, glass tubes are susceptible to variational influences and may exhibit some lack of continuity from the top to the bottom of the tube during the spinning process. A certain amount of transient flexure may adversely affect the accuracy of individual lenses being spun within the tube. Potential inhomogeneity within the glass itself may also contribute to varying and disparate amounts of ultraviolet light reaching the mold parts within the tube. If this were to occur through the vertical axis of the tube, certain mold parts within the tube may receive a variable level of UV radiation with possible deleterious effects.

Finally, when utilizing the prior art glass tubes in a spin casting system, the glass tubes are subject to undesirable vibrations. These vibrations in the glass tube are due to the inability to maintain a sufficiently rigid connection between the glass tube and the bearing mountings. Vibrations within a system utilizing a glass tube may generate a product that lacks sufficient precision (e.g. a contact lens with undesirable imperfections or defects).

What is needed is an apparatus, a system, and a method of mass-producing contact lenses via spin casting that overcomes the above-mentioned failings of prior art systems.

CITATION LIST

Patent Literature

PTL 1: U.S. Pat. No. 3,660,545
PTL 2: U.S. Pat. No. 4,517,138
PTL 3: U.S. Pat. No. 2,458,934

SUMMARY OF INVENTION

According to one exemplary embodiment, an apparatus for spin casting lenses comprising a rotatable tube, the rotatable tube defining a longitudinal cavity, wherein the longitudinal cavity is configured to receive molds. According to one exemplary embodiment, the rotatable tube is made of a stable non-glass material such as metal.

According to another exemplary embodiment, a method of centrifugally casting a lens comprising providing a first rotatable tube, introducing at least one mold into the internal bore of the first rotatable tube, the mold containing a polymerizable liquid, partially curing the polymerizable liquid in the first rotatable tube, removing the mold from the first rotatable tube, providing at least one second curing device, introducing the mold into the second curing device, and completing the curing of the polymerizable liquid in the second curing device.

According to yet another exemplary embodiment, a system for spin casting a lens comprising a first rotatable tube, the first rotatable tube being configured to partially cure a polymerizable liquid contained in at least one mold; and at least one second curing device, the second curing device being configured to finalize the curing of the polymerizable liquid contained in the mold.

According to yet another exemplary embodiment, a system for spin casting a lens, comprising a housing, a first rotatable tube disposed within the housing, at least one set of bearings mounted between the housing and the first rotatable tube, and a drive system for rotating the first rotatable tube.

BRIEF DESCRIPTION OF DRAWINGS

The accompanying drawings illustrate various embodiments of the principles described herein and are a part of the specification. The illustrated embodiments are merely examples and do not limit the scope of the claims.

FIG. 7A is a schematic view of a rotatable tube including an aperture according to an embodiment of the present exemplary system and method.

Throughout the drawings, identical reference numbers designate similar, but not necessarily identical, elements.

DETAILED DESCRIPTION

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The present exemplary system and methods are configured for the spin casting symmetrical or asymmetrical articles. More specifically, the present exemplary systems and methods are configured for the production of contact lenses including a rotatable tube adapted for accommodating a plurality of molds within the rotatable tube, wherein the rotatable tube may be constructed from a substantially opaque material containing apertures or sections of non-opaque material configured to selectively allow the passage of actinic radiation to facilitate the polymerization or photochemical cross-linking of material dispersed in the molds. As used in the present specification, the term "aperture" shall be interpreted broadly as including any portion of a rotatable member configured to selectively control the amount of light admitted within the member.

Molds

Figure 1:
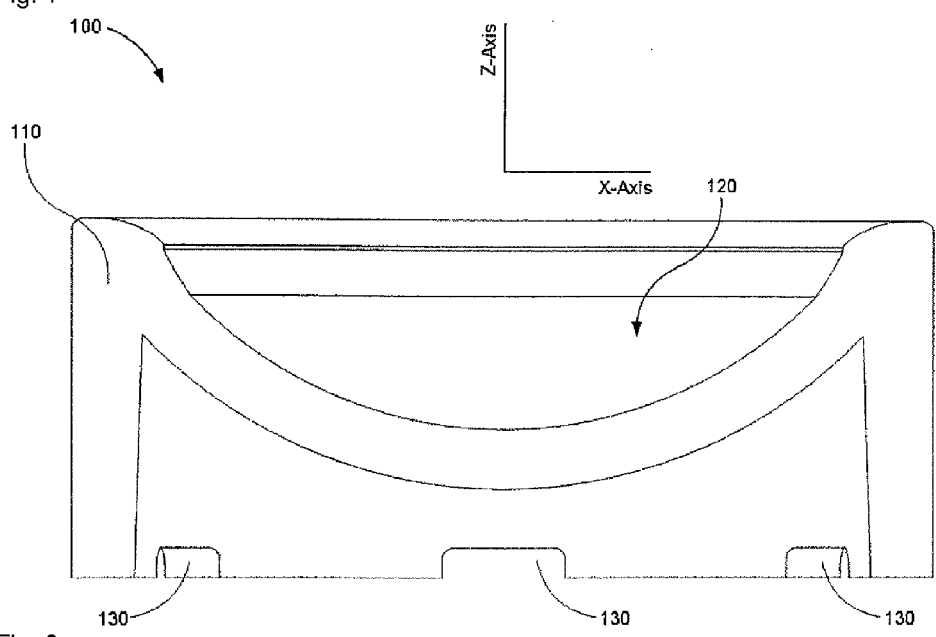
FIG. 1 is a cross-sectional view of a mold according to an embodiment of the present exemplary system and method.

FIG. 1 is a cross-sectional view of a mold (100) according to an embodiment of the present exemplary system and method. The mold (100) may include a cylindrical sidewall (110), to which a molding cavity (120) is internally connected. The concave surface of the molding cavity (120) serves to mold the convex surface of the article being molded (e.g. the convex or outer surface of a contact lens).

The molding cavity (120) is connected to the cylindrical wall (110) of the mold (100). The connection between the molding cavity (120) and the cylindrical wall (110) may be any means of connection such that the relative position between molding cavity (120) and the cylindrical wall (110) cannot change during a specified length of time or throughout a predetermined operation. In one exemplary embodiment, the connection between the molding cavity (120) and the cylindrical wall (110) may be made by welding the molding cavity (120) to the cylindrical wall (110). In another embodiment, the connection between the molding cavity (120) and the cylindrical wall (110) may be made by forming the molding cavity (120) and the cylindrical wall (110) out of a single piece of material, such as in an injection molding process. In yet another embodiment, the molding cavity (120) and the cylindrical wall (110) may be removably coupled. For example, mechanical means for removably connecting the molding cavity (120) to the cylindrical wall (110) may be provided.

The mold (100) may further include a number of engagement apertures (130). The mold (100) may be introduced as a stacked column of molds in a rotatable tube, as will be discussed in more detail below. When entering the rotatable tube, the mold (100) may be secured with respect to the horizontal axis of the rotatable tube via the engagement apertures (130). For example, mechanical means may be provided to engage the engagement apertures (130). In one exemplary embodiment, the engagement apertures (130) may be used to secure a number of molds (100) introduced into the rotatable tube.

In yet another embodiment, the engagement apertures (130) may be used to secure only the bottom mold (100). In this embodiment, the remaining molds (100) may rest on top of, and be supported by, the bottom mold (100). Further, in this embodiment, the engagement apertures (130) of the remaining molds (100) may provide for diffusion of an inert gas throughout the rotatable tube and between individual molds (100) as will be discussed in more detail below.

Figure 2:
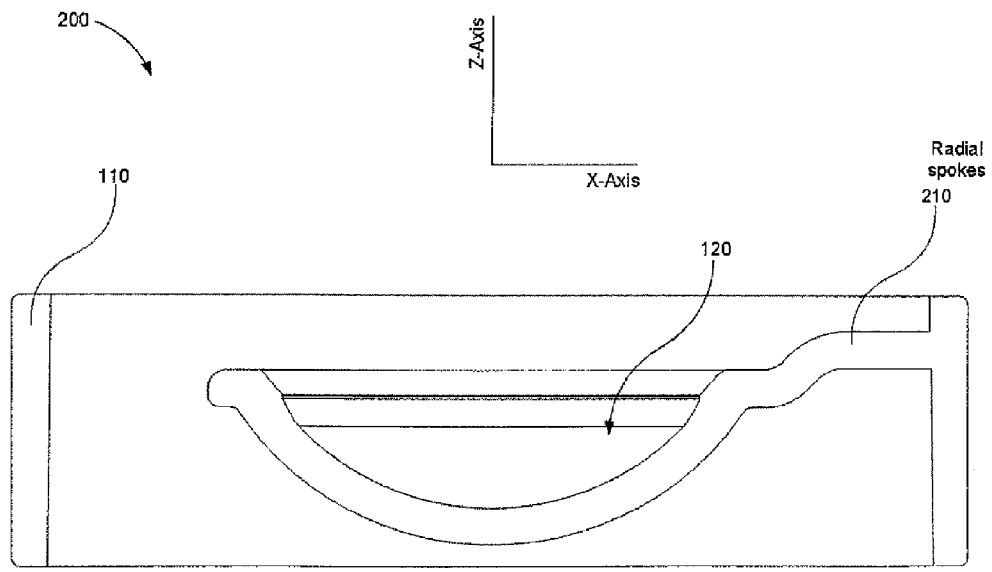
FIG. 2 is a cross-sectional view of a mold according to another embodiment of the present exemplary system and method.
Figure 3:
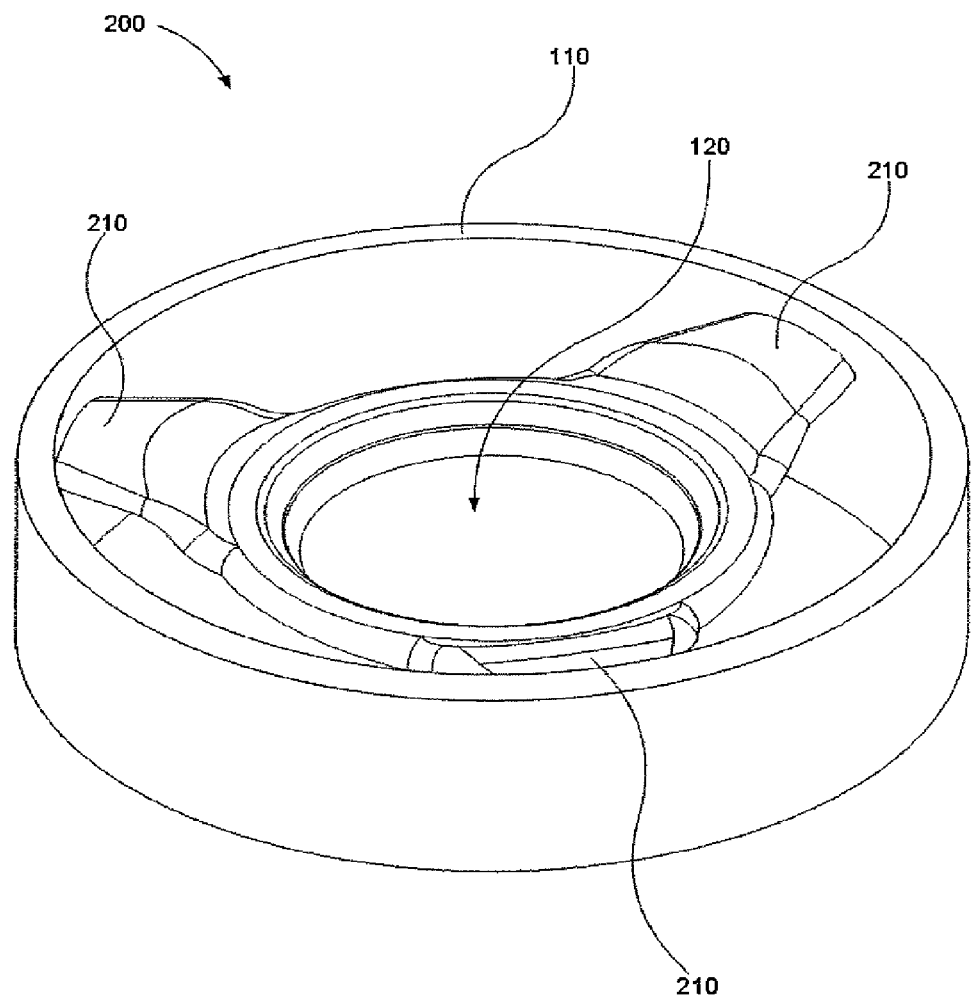
FIG. 3 is a schematic view of the mold of FIG. 2 according to an embodiment of the present exemplary system and method.

Turning now to FIGS. 2 and 3; FIG. 2 is a cross-sectional view of a mold (200) according to another exemplary embodiment of the present exemplary system and method, and FIG. 3 is a schematic view of the mold (200) of FIG. 2 according to an exemplary embodiment of the present exemplary system and method. In the embodiment of FIGS. 2 and 3, the connection between the molding cavity (120) and the cylindrical wall (110) may be made by a number of radial spokes (210). As is shown in FIG. 3, three radial spokes (210) connect the molding cavity (120) and cylindrical wall (110). However, any number of radial spokes (210) may be utilized. Further, as shown in FIGS. 2 and 3, the radial spokes (210), molding cavity (120), and the cylindrical wall (110) may be formed from a single piece of material, such as in a single injection molding process. However, the radial spokes (210), molding cavity (120), and the cylindrical wall (110) may alternatively be formed from different materials and as separate elements. Further, the molding cavity (120) and the cylindrical wall (110) of the embodiment of FIGS. 2 and 3 may be removably coupled. For example, mechanical means for removably connecting the molding cavity (120) to the cylindrical wall (110) may be provided.

Interface Between the Molds and the Rotatable Tube

Figure 4:
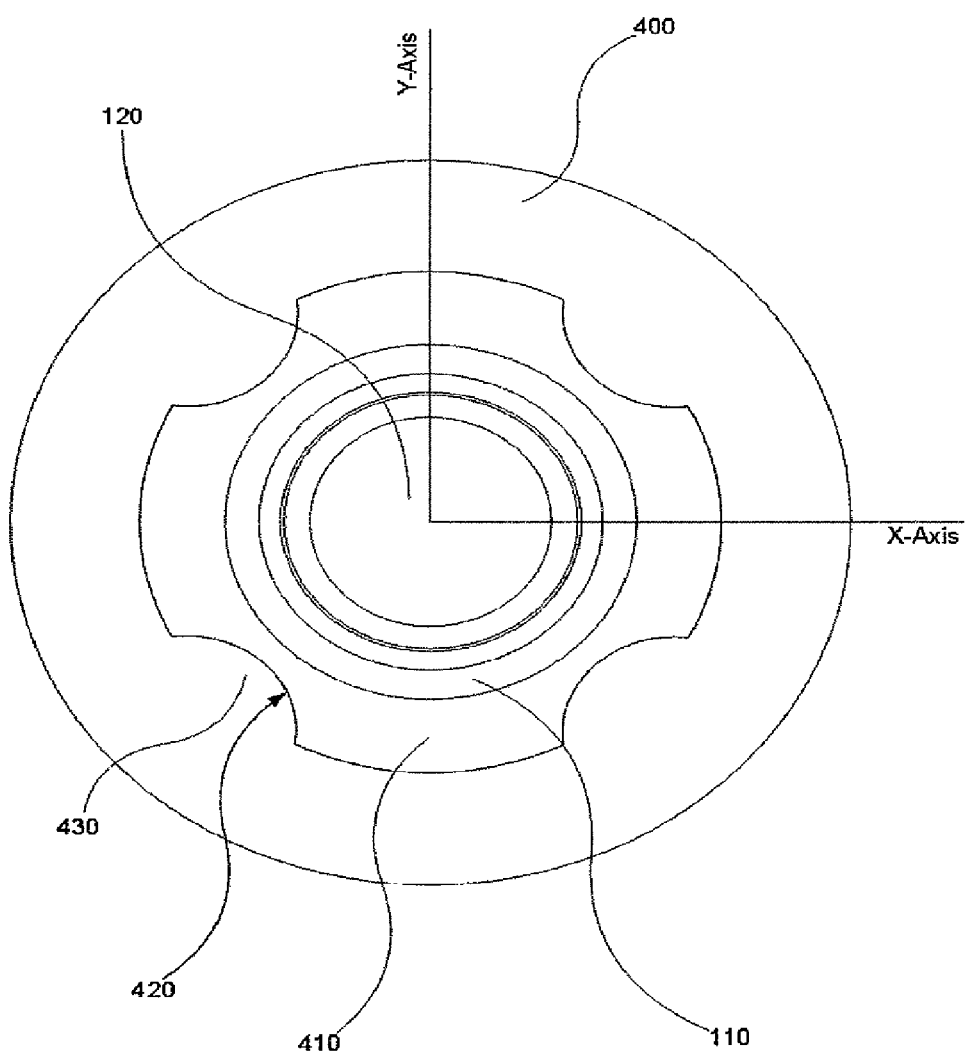
FIG. 4 is a cross sectional top view of the mold of FIG. 1 in removable engagement with a rotatable tube according to an embodiment of the present exemplary system and method.

FIG. 4 is a cross sectional top view of the mold (100) of FIG. 1 in removable engagement with a rotatable tube (400) according to an embodiment of the present exemplary system and method. The mold (100) may be placed inside a rotatable tube (400) as will be discussed in more detail below. In order to ensure that the mold (100) remains secure inside the rotatable tube (400), the mold (100) may further include an interface ring (410) for retaining the mold (100) and the rotatable tube (400) in symmetrical rotation. The interface ring (410) may include a number of voids (420) that run longitudinally, or, in other words, parallel with respect to the z-axis of the mold (100) and rotatable tube (400) as depicted in FIG. 4. The voids (420) may be formed in the interface ring (410) by any manner as is known in the art. For example, in one embodiment, the interface ring (410) may be cast as a single piece which defines the voids (420). In another embodiment, the interface ring (410) may be formed as a single piece, and the voids (420) may be removed from the interface ring (410) by drilling, boring, etching, etc.

Further, the rotatable tube (400) may include a number of protrusions (430) on the interior wall of the rotatable tube (400). The protrusions (430) may run longitudinally along the interior of the rotatable tube (400), or, in other words, parallel with respect to the z-axis of the rotatable tube (400) as depicted in FIG. 4.

The protrusions (430) of the rotatable tube (400) and the voids (420) of the interface ring (410) may form an interference fit, and may be held in place by frictional forces. The interference fit may be such that when the rotatable tube (400) is rotated, the interface ring (410), and, thus, the mold (100) remains in symmetrical rotation with the rotatable tube (400). The voids (420) and protrusions (430) may be of any shape or form. For example, as depicted in FIG. 4, the border between the voids (420) and protrusions (430) form a semicircular line. However, any shape that creates a sufficiently close-fitting interface between the rotatable tube (400) and the interface ring (410) is within the scope of the present exemplary system and method. For example, a void and protrusion pair that forms an angular line between the rotatable tube (400) and the interface ring (410) may also be used. One important control criteria is that the mould/tube relationship minimizes circumferential run out aspects and maintaining a controllable spin variant that is consistent with both the desired input speed and the other moulds within the tube.

Further, any number of void and protrusion pairs may be formed between the rotatable tube (400) and the interface ring (410). For example, FIG. 4 depicts four void and protrusion pairs. However, any number of void and protrusion pairs may be used. In yet another embodiment, the voids (420) may be formed in the rotatable tube (400), and the protrusions (430) may be formed on the interface ring (410).

Figure 5:
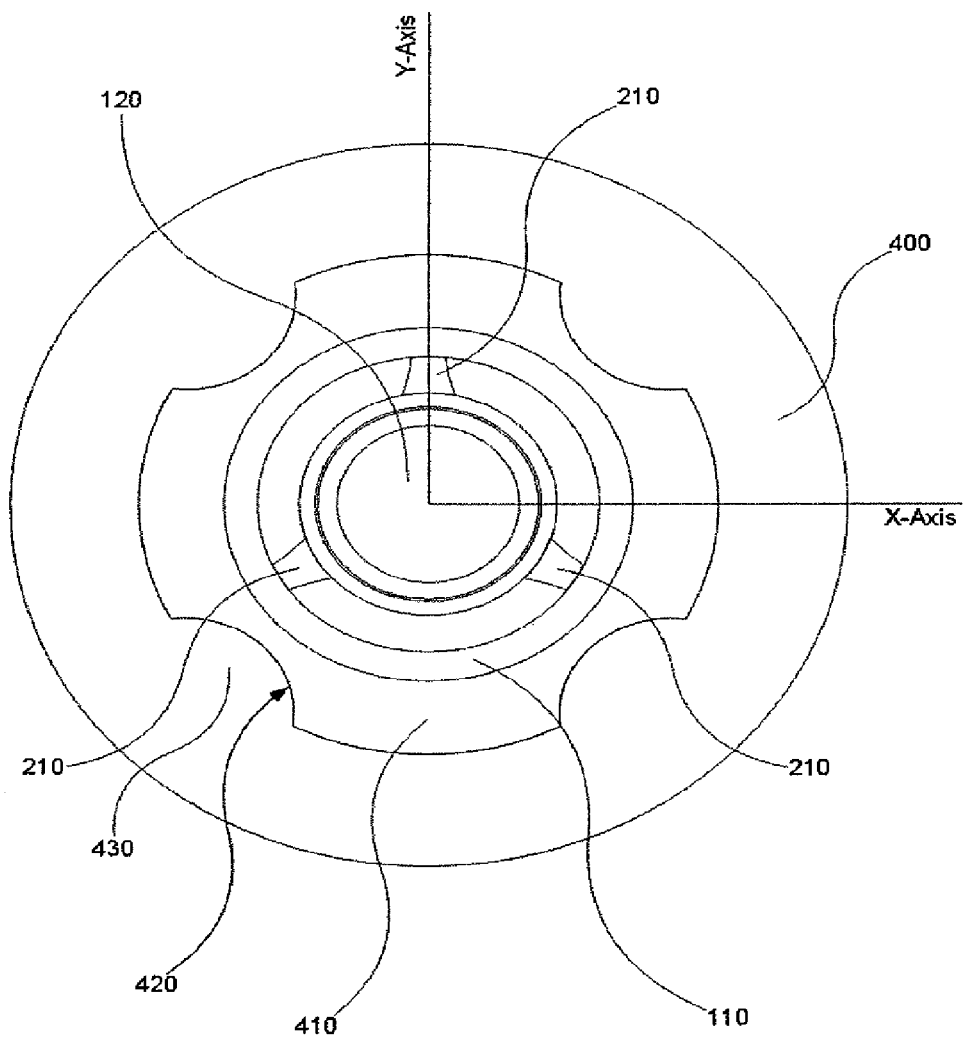
FIG. 5 is a cross sectional top view of the mold of FIG. 2 in removable engagement with a rotatable tube according to an embodiment of the present exemplary system and method.

FIG. 5 is a cross sectional top view of the mold (200) of FIG. 2 in removable engagement with a rotatable tube (400) according to an embodiment of the present exemplary system and method. Similar to the mold (100) of FIG. 4, the mold (200) of FIG. 5 may be placed inside a rotatable tube (400) as will be discussed in more detail below. In order to ensure that the mold (200) remains secure inside the rotatable tube (400), the mold (200) may further include an interface ring (410) for retaining the mold (200) and the rotatable tube (400) in symmetrical rotation. The interface ring (410) may include a number of voids (420) that run longitudinally with respect to the z-axis of the mold (200) and rotatable tube (400) as depicted in FIG. 5. The voids (420) may be formed in the interface ring (410) by any manner as is known in the art. For example, in one embodiment, the interface ring (410) may be cast as a single piece which defines the voids (420). In another embodiment, the interface ring (410) may be formed as a single piece, and the voids (420) may be removed from the interface ring (410) by drilling, boring, etching, etc.

The rotatable tube (400) may include a number of protrusions (430) on the interior wall of the rotatable tube (400). The protrusions (430) may run longitudinally along the interior of the rotatable tube (400) with respect to the z-axis of the rotatable tube (400) as depicted in FIG. 5.

The protrusions (430) of the rotatable tube (400) and the voids (420) of the interface ring (410) may form an interference fit, and may be held in place by frictional forces. The interference fit may be such that when the rotatable tube (400) is rotated, the interface ring (410), and, thus, the mold (100) remains in symmetrical rotation with the rotatable tube (400). The voids (420) and protrusions (430) may be of any shape or form. For example, as depicted in FIG. 4, the border between the voids (420) and protrusions (430) form a semicircular line. However, any shape that creates a sufficiently close-fitting interface between the rotatable tube (400) and the interface ring (410) is within the scope of the present exemplary system and method. For example, a void and protrusion pair that forms an angular line between the rotatable tube (400) and the interface ring (410) may also be used.

Further, any number of void and protrusion pairs may be formed between the rotatable tube (400) and the interface ring (410). For example, FIG. 4 depicts four void and protrusion pairs. However, any number of void and protrusion pairs may be used. In yet another exemplary embodiment, the voids (420) may be formed in the rotatable tube (400), and the protrusions (430) may be formed on the interface ring (410).

In another embodiment, the molds (FIG. 1, 100; FIG. 2, 200) may be retained within the rotatable tube (400) via an active mechanical means. This exemplary embodiment will be explained in further detail below.

Rotatable Tube

Figure 6:
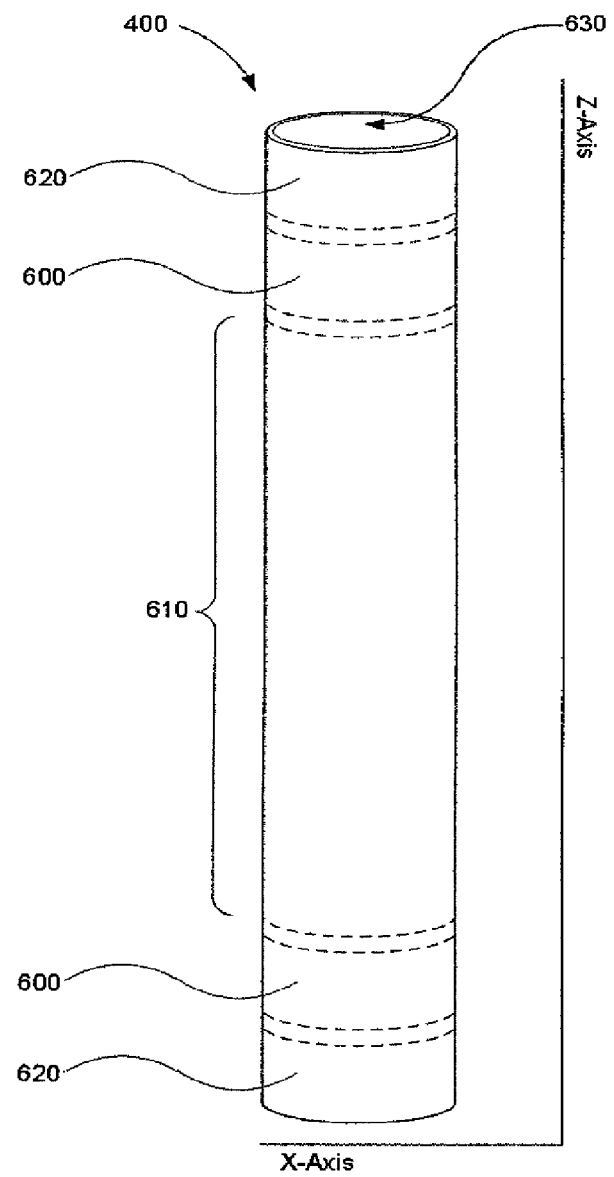
FIG. 6 is a schematic view of a rotatable tube according to an embodiment of the present exemplary system and method.

FIG. 6 is a schematic view of a rotatable tube (400) according to an exemplary embodiment of the present exemplary system and method. The exemplary rotatable tube (400) may, according to one exemplary embodiment, include four zones: two bearing mounting zones (600), a curing zone (610), and at least one drive zone (620). Preferably the bearing mounting zones (600) are dispersed on either side of the curing zone (610). The drive zone (620) may be at one end of the rotatable tube (400), or between the curing zone (610) and one or more of the bearing mounting zones (600).

According to one exemplary embodiment, the rotatable tube (400) may be constructed from a rigid, ideally non-brittle, material with a precision internal bore (630). The internal bore (630) of the rotatable tube (400) may provide for a minimal disparity in mold-to-bore fit with a number of enclosed molds (FIG. 1, 100; FIG. 2, 200) such that the rotation of the rotatable tube (400) causes synchronized rotation of the molds (FIG. 1, 100; FIG. 2, 200) at the same angular speed as that of the rotatable tube (400) while maintaining the concentricity of the molds (FIG. 1, 100; FIG. 2, 200) contained within the curing zone (610) with respect to the longitudinal axis of the rotatable tube (400). This thereby effectively ensures the production of a plurality of symmetrical or asymmetrical spun cast identical articles, when a photo-initiated composition (e.g., a photochemically polymerizable or photo-crosslinkable composition) contained within molds (FIG. 1, 100; FIG. 2, 200) is exposed to actinic radiation (e.g. ultraviolet light).

The rotatable tube (400) may, according to one exemplary embodiment, be fabricated from a variety of materials. For example, the rotatable tube (400) may be made of ceramic, carbon fiber, Polytetrafluoroethylene (PTFE or Teflon), Polyetheretherketone (PEEK), or any other suitable rigid engineering material. Further, the rotatable tube (400) may be made from metals such as, for example, stainless steel, brass, titanium, or aluminum. Generally, the rotatable tube (400) may be made of a sufficiently strong material that is able to withstand torsional forces applied to the rotatable tube (400) when the rotatable tube (400) is rotated. The various attributes of the rotatable tube (400) of FIG. 6 may also apply to other various embodiments of the rotatable tube discussed herein.

Additionally, according to one exemplary embodiment, the internal bore (630) of the rotatable tube (600) may be reflective. The reflective property of the internal bore (630) may be achieved by applying a reflective coating such as, for example, silver to the internal bore (630). In another exemplary embodiment, the reflective property of the internal bore (630) of the rotatable tube (600) may be formed by providing a rotatable tube (600) made of metal and polishing the internal bore (630) such that the internal bore (630) becomes sufficiently smooth to reflect radiant energy. For example, the rotatable tube (600) may be made of stainless steel, wherein, when the internal bore (630) of the stainless steel rotatable tube (600) is polished or otherwise made sufficiently smooth, the internal bore (630) reflects radiant energy. Providing an internal bore (630) that reflects radiant energy may allow for actinic radiation that enters the rotatable tube (600) to more uniformly initiate the photochemical polymerization reaction of the polymerizable liquid contained within the molds (FIG. 1, 100; FIG. 2, 200) of the rotatable tube (600), thus more perfectly curing a particular contact lens.

FIGS. 7A-11B illustrate rotatable tubes (400) including apertures according to several embodiments of the present exemplary system and method. In these exemplary embodiments, at least one aperture is provided within the curing zone (FIG. 6, 610) to allow passage of actinic radiation. As discussed above, a photo-initiated composition (i.e., a photochemically polymerizable or photo-crosslinkable composition) contained within molds (FIG. 1, 100; FIG. 2, 200) may be cured via exposure to actinic radiation that enters in through the apertures. The apertures within the curing zone (FIG. 6, 610) may be open, or filled with a material transparent to actinic radiation.

Figure 7B:
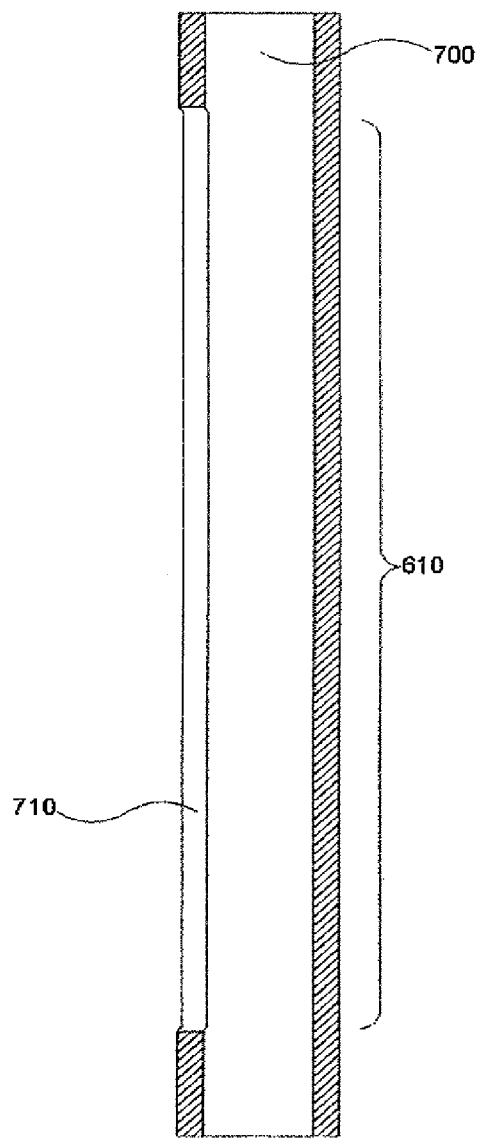
FIG. 7B is a cross-sectional view of the rotatable tube of FIG. 7A according to an embodiment of the present exemplary system and method.

First, FIG. 7A is a schematic view of a rotatable tube (700) including an aperture (710) according to an embodiment of the present exemplary system and method. The embodiment of FIG. 7A comprises a rotatable tube (700) containing a single aperture, wherein the aperture comprises a longitudinal slot (710). The longitudinal slot (710) extends the length of the curing zone (610), and is of uniform width. The width of the longitudinal slot (710) may occupy a distance of 0.05 to 49% of the outer circumference of the rotatable tube (700). FIG. 7B is a cross-sectional view of the rotatable tube (700) of FIG. 7A. As is illustrated in FIG. 7B, the rotatable tube (700) has been rotated a quarter of a turn in order to better illustrate the longitudinal slot (710). The longitudinal slot (710) may be formed in the rotatable tube (700) by drilling, boring, etching, wire cutting, casting, or any other method. With regard to this and other embodiments of the rotatable tube, it is necessary to provide in the surface area of the rotatable tube with a sufficiently large percentage of aperture space to allow a sufficient amount of actinic radiation to enter the tube, thus increasing the effective exposure of the polymerizable liquid contained within the molds (FIG. 1, 100; FIG. 2, 200) inside the rotatable tube.

Figure 8A:
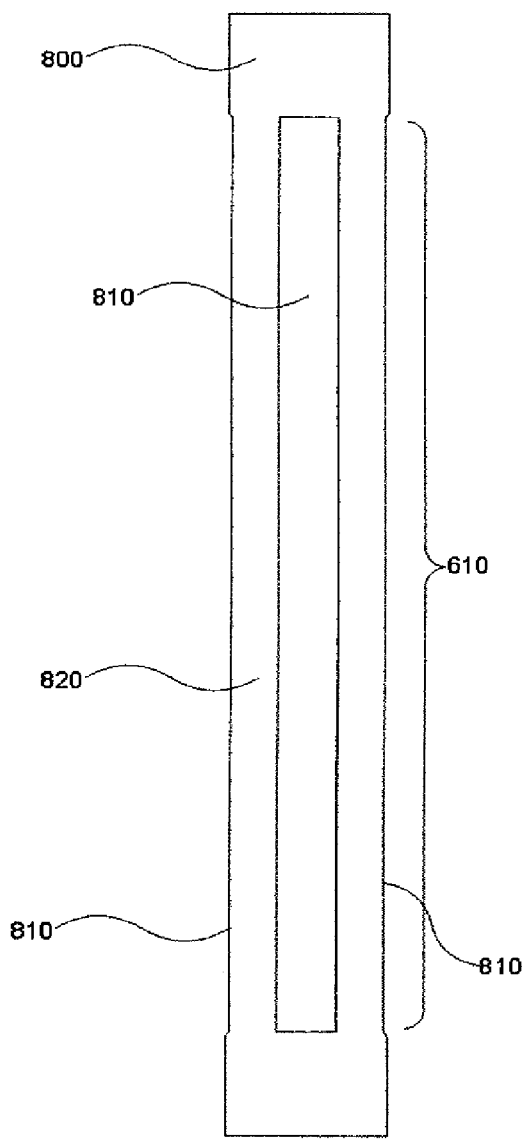
FIG. 8A is a schematic view of a rotatable tube including a plurality of apertures according to an embodiment of the present exemplary system and method.
Figure 8B:
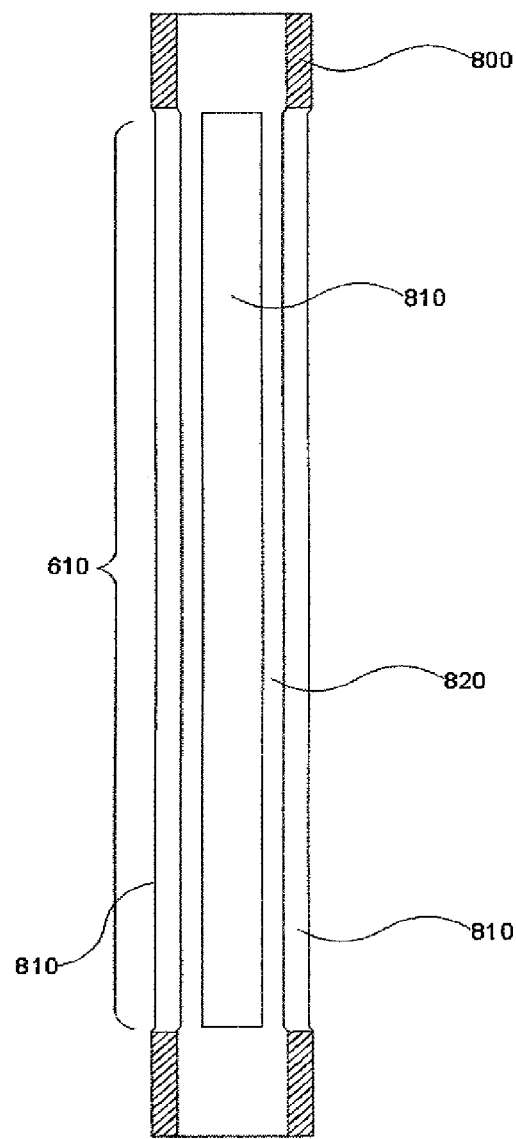
FIG. 8B is a cross-sectional view of the rotatable tube of FIG. 8A according to an embodiment of the present exemplary system and method.

FIG. 8A is a schematic view of a rotatable tube (800) including a plurality of apertures (810) according to an embodiment of the present exemplary system and method. As illustrated in FIG. 8A, one means for increasing the effective exposure of elements, and specifically molds (FIG. 1, 100; FIG. 2, 200) contained within the rotatable tube (800), to actinic radiation is to increase the number of apertures within the curing zone (610) of the rotatable tube (800). In FIG. 8A, the rotatable tube (800) includes a plurality of longitudinal slots (810), with each longitudinal slot (810) being equal in length, and extending the length of the mold-containing portion of the rotatable tube (800). FIG. 8B is a cross-sectional view of the rotatable tube of 8A better illustrating the plurality of longitudinal slots (810). Preferably, the longitudinal slots (810) should be of equal width, and equally disposed about the rotatable tube (800) so as to provide a consistent and uniform transmission of actinic radiation to the interior of the rotatable tube (800). A sufficient amount of intermediary material (820) may also be left between the longitudinal slots (810) so as to provide sufficient torsional strength throughout the rotatable tube (800). In other words, the torsional strength of the rotatable tube (800) provides for synchronized rotation of the molds (FIG. 1, 100; FIG. 2, 200) contained within the rotatable tube (800) at the same angular speed as the rotatable tube (800), while maintaining the concentricity of the molds (FIG. 1, 100; FIG. 2, 200) with regard to the to the longitudinal axis of the rotatable tube (800).

Figure 9A:
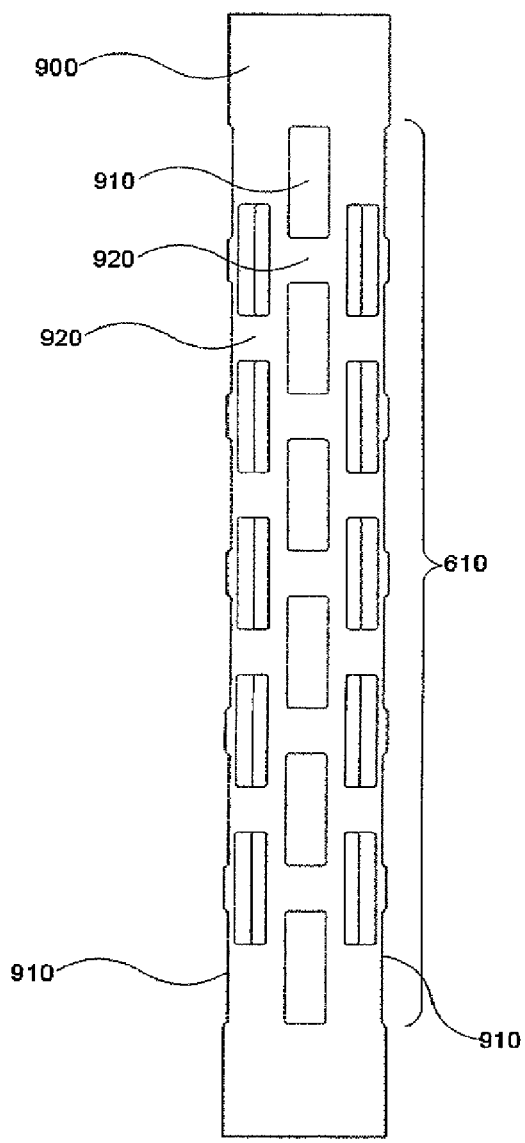
FIG. 9A is a schematic view of a rotatable tube including a plurality of rectangular apertures according to an embodiment of the present exemplary system and method.
Figure 9B:
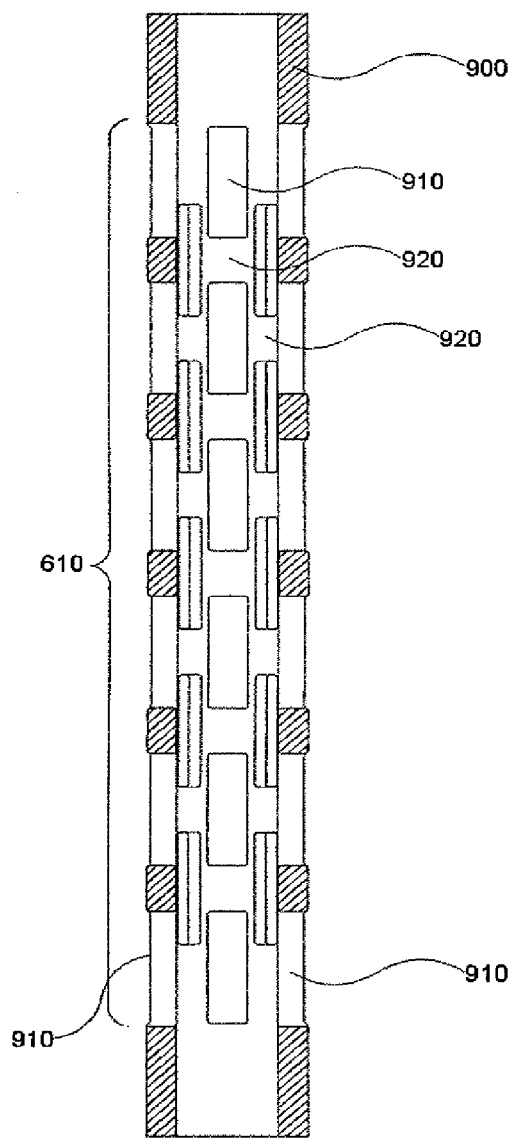
FIG. 9B is a cross-sectional view of the rotatable tube of FIG. 9A according to an embodiment of the present exemplary system and method.

Turning now to FIG. 9A, a schematic view of a rotatable tube (900) including a plurality of rectangular apertures (910) according to an embodiment of the present exemplary system and method is illustrated. FIG. 9B is a cross-sectional view of the rotatable tube of FIG. 9A. The staggering of the rectangular apertures (910) throughout the rotatable tube (900) may provide for a sufficiently robust rotatable tube (900) that is not subject to torsional distortions. Further, dependent or independent of the potential torsional distortion of the rotatable tube (900), a vibrational mode may be established in which the walls of the rotatable tube (9000 may flex outwards. This vibrational mode may result in a loss of friction between the molds (FIG. 1, 100; FIG. 2, 200) and the inner wall of the rotatable tube (900), or may allow the molds (FIG. 1, 100; FIG. 2, 200) to rotate non-concentrically with respect to the longitudinal axis of the rotatable tube (900). The staggering of the rectangular apertures (910) in the rotatable tube (900) of FIGS. 9A and 9B may provide for a sufficiently sturdy rotatable tube (900). This may be accomplished by providing a sufficient amount of intermediary material (920) as also addressed above in connection with FIGS. 8A and 8B.

Figure 10A:
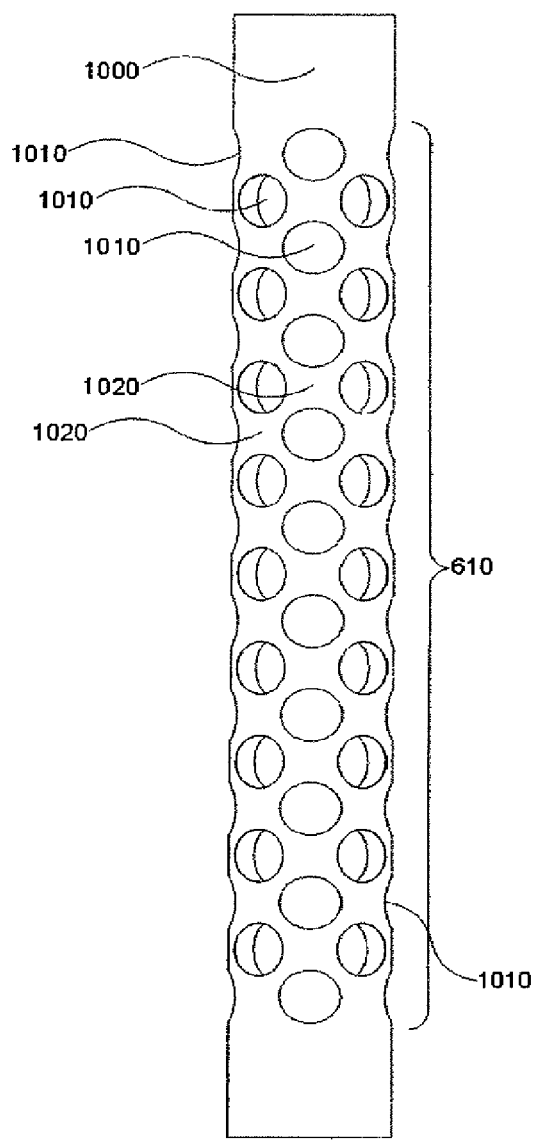
FIG. 10A is a schematic view of a rotatable tube including a plurality of circular apertures according to an embodiment of the present exemplary system and method.
Figure 10B:
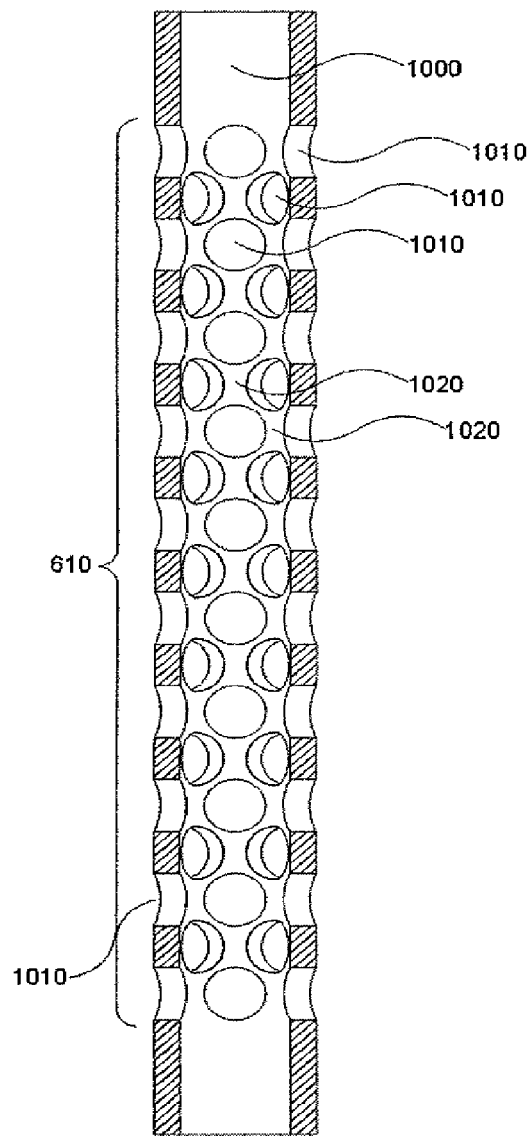
FIG. 10B is a cross-sectional view of the rotatable tube of FIG. 10A according to an embodiment of the present exemplary system and method.

FIG. 10A is a schematic view of a rotatable tube (1000) including a plurality of circular apertures (1010) according to an embodiment of the present exemplary system and method. FIG. 10B is a cross-sectional view of the rotatable tube (1010) of FIG. 10A. Similar to the previously addressed embodiments, the rotatable tube (1000) of FIGS. 10A and 10B includes a plurality of circular apertures (1010) with a sufficient amount of intermediary material (1020) provided between the circular apertures (1010). In this embodiment, the percentage of intermediary material (1020) may be further increased while still maintaining a sufficient amount of circular apertures (1010) throughout the rotatable tube (1010) so as to provide a sufficient amount of actinic radiation to permeate throughout the rotatable tube (1010).

Figure 11A:
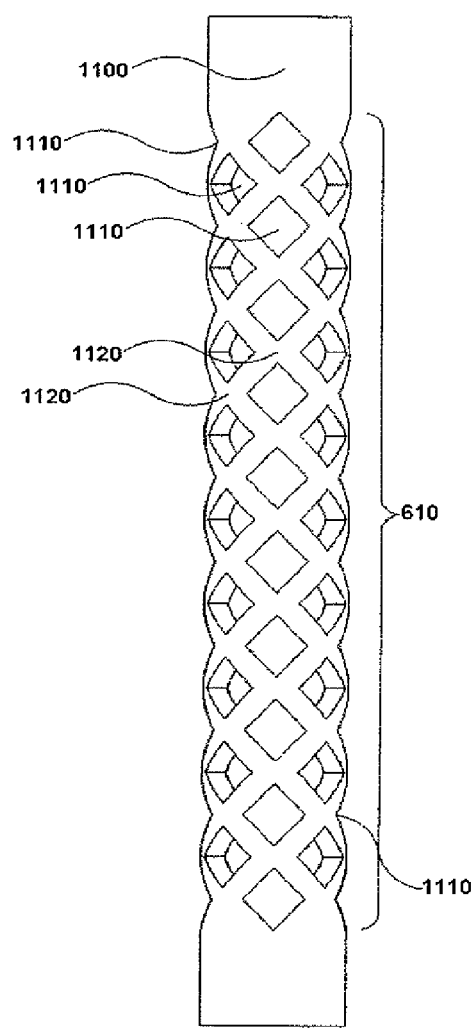
FIG. 11A is a schematic view of a rotatable tube including a plurality of diamond-shaped apertures according to an embodiment of the present exemplary system and method.
Figure 11B:
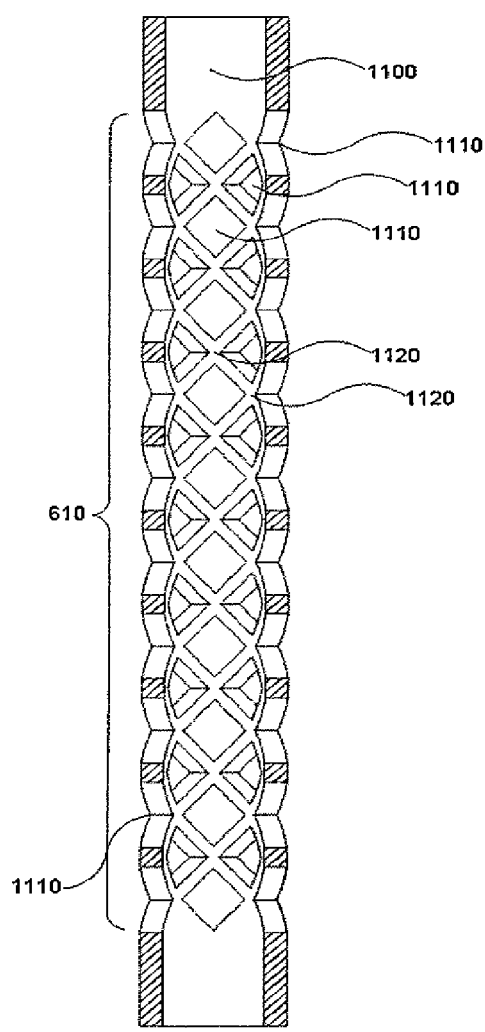
FIG. 11B is a cross-sectional view of the rotatable tube of FIG. 11A according to an embodiment of the present exemplary system and method.

FIG. 11A is a schematic view of a rotatable tube (1100) including a plurality of diamond-shaped apertures (1110) according to another embodiment of the present exemplary system and method. FIG. 11B is a cross-sectional view of the rotatable tube (1110) of FIG. 11A better illustrating the diamond-shaped apertures (1110). In the embodiment of FIGS. 11A and 11B, the rotatable tube (1100) comprises a curing zone (610) containing a plurality of apertures (1110) disposed about the curing zone (610). The apertures (1110) depicted in FIGS. 11A and 11B are of a general diamond shape.

However, the apertures (710, 810, 910, 1010, 1110) may be any variety of shapes, such as, for example, longitudinal slots, short slots, or circles as illustrated in the above embodiments. The apertures (710, 810, 910, 1010, 1110) may further include ovals, diamonds, triangles, or any combination of shapes. The apertures (710, 810, 910, 1010, 1110) may be disposed in a staggered configuration throughout the curing zone (610) of the rotatable tube (1100) so as to allow even curing of the molds (FIG. 1, 100; FIG. 2, 200) contained within the rotatable tube (1100). In general, the shape of the apertures may be symmetric in both the horizontal and vertical directions, and placed so that no side of the aperture lies in the x-y plane of the rotatable tube. The apertures may be designed to facilitate an even and homogenous distribution of actinic radiation to the molds (FIG. 1, 100; FIG. 2, 200) contained within the curing zone (610). The use of non-uniform aperture shapes or boundaries of shapes may also be effectively used to ensure that UV homogeneity occurs throughout the entire curing zone of the rotatable tube, irrespective of individual mold (FIG. 1, 100; FIG. 2, 200) placement within the curing zone of the rotatable tube. Various well-known means of optical clarification such as ray tracing may be used to optimize the aperture (910) shapes and boundaries.

Figure 12A:
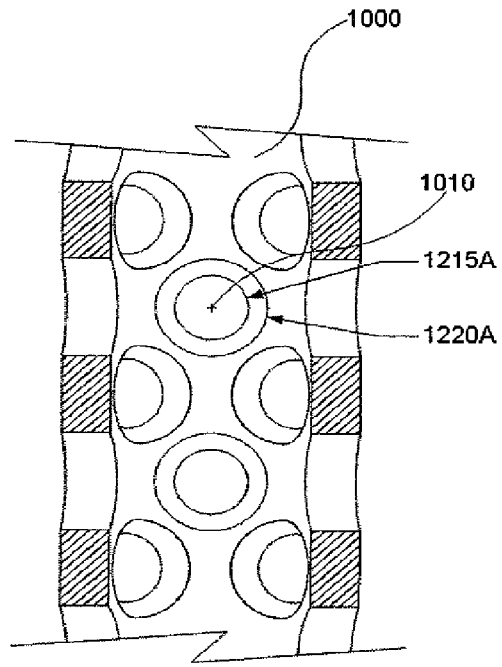
FIG. 12A is a cross-sectional view of a portion of the rotatable tube of FIGS. 10A and 10B including a plurality of tapered apertures according to an embodiment of the present exemplary system and method.
Figure 12B:
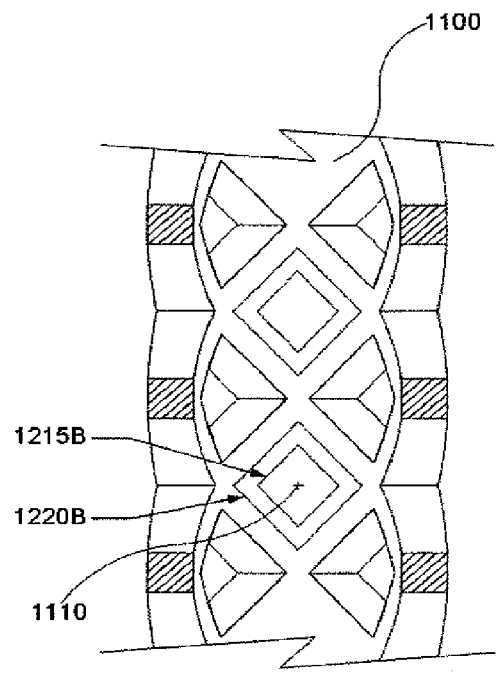
FIG. 12B is a cross-sectional view of a portion of the rotatable tube of FIGS. 11A and 11B including a plurality of tapered apertures according to an embodiment of the present exemplary system and method.

FIG. 12A is a cross-sectional view of a portion of the rotatable tube of FIGS. 10A and 10B including a plurality of tapered apertures according to an embodiment of the present exemplary system and method. Similarly, FIG. 12B is a cross-sectional view of a portion of the rotatable tube of FIGS. 11A and 11B including a plurality of tapered apertures according to an embodiment of the present exemplary system and method. As illustrated in FIGS. 12A and 12B, as well as throughout the various embodiments discussed above, and other possible embodiments, the apertures (1010, 1110) may be wider towards the inside of the rotatable tube (1000, 1100) than the outside. In other words, the apertures (1010, 1110) of the various embodiments may taper from the internal bore to the outside surface of the rotatable tube (1000, 1100).

Specifically, in FIG. 12A, the rotatable tube (1000) of FIGS. 10A and 10B may be provided with a plurality of circular apertures (1010) with a depth equaling the thickness of the rotatable tube (1000). An individual aperture (1010) may include two different radii; namely a smaller radius (1215A) located on the outer surface of the rotatable tube (1000), and a larger radius (1220A) located on the inner surface of the rotatable tube (1000).

Similarly, in FIG. 12B, the rotatable tube (1010) of FIGS. 11A and 11B may be provided with a plurality of diamond shaped apertures (1110) with a depth equaling the thickness of the rotatable tube (1100). An individual aperture (1110) may include two different sizes of diamond shapes; namely a smaller size (1215B) located on the outer surface of the rotatable tube (1100), and a larger size (1220B) located on the inner surface of the rotatable tube (1000).

By providing a tapered configuration within the apertures (1010, 1110), the apertures (1010, 1110) may provide greater illumination of the contained molds (FIG. 1, 100; FIG. 2, 200), as well as reduce the physical area of contact between the molds (FIG. 1, 100; FIG. 2, 200) and the internal bore of the rotatable tube (1000, 1100). Further, it has been found that such an arrangement mitigates spillage of polymerizable liquid from the molds (FIG. 1, 100; FIG. 2, 200) which would otherwise contaminate the internal walls of the rotatable tube. Spillage of polymerizable liquid may lead to the molds (FIG. 1, 100; FIG. 2, 200) becoming adhered to the rotatable tube (1000, 1100), and causing blockages at the end of the curing cycle when the cured parts are ejected from the rotatable tube (1000, 1100).

Any tendency for spilt monomer to adhere to the internal bore of the rotatable tube may also be reduced by providing the rotatable tube with a lower energy surface (typically below 30 Dyne/cm), either by careful choice of material from which the rotatable tube is made of (i.e. PEEK, PTFE, etc.), or by applying to the internal bore of the rotatable tube a hydrophobizing surface treatment. The hydrophobizing surface treatment may include, for example, a suitable silane coupling agent (i.e., octadecyltrimethoxysilane, dimethyl dichlorosilane, etc.). In another embodiment, a hydrophobizing surface may be achieved by plasma polymerization of hydrocarbons such as methane onto the surfaces of the rotatable tube.

While the present exemplary system has been described as including a tube having a number of symmetrical orifices in the non-transparent material, any combination of non-symmetrical orifices may also be used. Additionally, other configurations have been contemplated, according to the teachings of the present exemplary system and method. For example, according to one embodiment, the rotatable tube (1000) may include a semi circular metal section with full metal sections at the bearing mounts while incorporating at least one transparent or translucent window medium that circumvents an "aperture".

Contact Lens Manufacturing System

Figure 13:
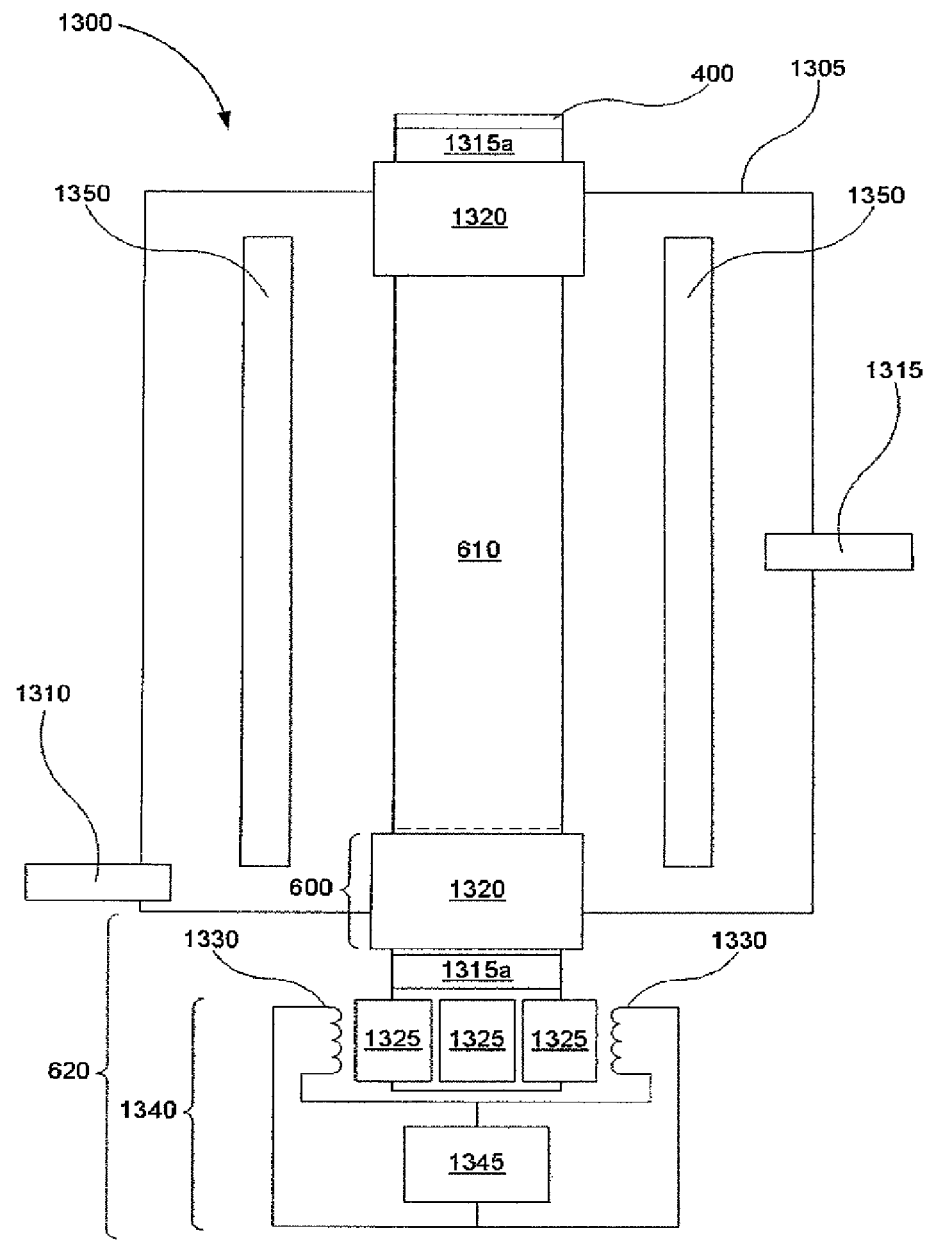
FIG. 13 is a block diagram of a contact lens manufacturing system according to an embodiment of the present exemplary system and method.

FIG. 13 is a block diagram of a contact lens manufacturing system (1300) according to an embodiment of the present exemplary system and method. The system (1300) may include a housing (1305) to house the rotatable tube (400). The housing (1305) may be hermetically sealed so as to prevent contamination from entering the area. Further, the housing (1305) may be hermetically sealed so that an inert gas may be introduced to the system. As discussed above, to avoid the inhibiting effects of atmospheric oxygen during the polymerization process, the molds (FIG. 1, 100; FIG. 2, 200) and polymerizable liquid are maintained in an inert gas rich, oxygen free atmosphere of, for example, nitrogen or argon. The use of an external curing means such as actinic radiation as an external trigger for the polymerization coupled with the anaerobic atmosphere provided by the inert atmosphere allows for the polymerizable liquid to attain its equilibrium shape under rotation prior to the initiation of polymerization. The use of an inert gas within the system further provides for sufficient time for any oxygen present within the mold or dissolved in the polymerizable liquid to diffuse away from the polymerizable liquid.

Therefore, the housing (1305) surrounding the rotatable tube (400) may include a means of providing an inert atmosphere within the housing (1305) and rotatable tube (400). The inert atmosphere within the housing (1305) may be accomplished, for example, by providing a number of inlet ports (1310) at either a single point into the space between the rotatable tube (400) and the interior housing wall, or at a plurality of points, arranged, either radially or longitudinally about the housing in order to allow the passage of inert gas into the interior of the housing (1305). Thus, an inert gas may be introduced at either a single point in the space between the rotatable tube (400) and the interior wall of the housing (1305), or at a plurality of points, arranged either radially or longitudinally about the housing (1305).

The inert gas introduced into the housing (1305) will be free to diffuse through the apertures within the curing zone (610) of the rotatable tube (400). In one embodiment, the molds (FIG. 1, 100; FIG. 2, 200) contained within the rotatable tube (400) may contain castellations, cutaways, engagement apertures (FIG. 1, 130), or any number of other apertures in the cylindrical sidewall to allow the passage of gas into the mold column, as mentioned above. In another embodiment, the molds (FIG. 1, 100; FIG. 2, 200) should be affixed to the cylindrical side wall of the rotatable tube (400) via a plurality of radial spokes (210), as discussed above, thus allowing the longitudinal passage of inert gas through the column of molds (FIG. 1, 100; FIG. 2, 200).

At the same time, the use of excess inert gas during the polymerization of the polymerizable liquid may cause the entrainment of monomer in the form of vapors and the subsequent deposition and/or polymerization of the monomer on the surrounding objects. In particular, the monomer vapors may be deposited and/or polymerized on the equipment utilized by the system (1300). The egress of the inert gas from the housing (1005) from either end of the rotatable tube (400) may be controlled via a variety of gas egress means. Generally, there may be provided a number of inert gas egress ports (1315) for allowing a volume of inert gas to escape the housing (1305). For example, inert gas egress may be effectuated by the use of plugs, iris valves, flap valves, plungers, etc. In one exemplary embodiment, inert gas egress from the rotatable tube (4000) may be restricted by placing a number of plugs (1315a) at the top and/or bottom of the rotatable tube (400) containing a column of molds (FIG. 1, 100; FIG. 2, 200), but allowing for gas egress in the area juxtaposition to the curing zone (610). The plugs (1315a) may be cylindrical in shape and of identical outside diameter as the molds (FIG. 1, 100; FIG. 2, 200). Further, the plugs (1315a) may be the same height as an individual mold (FIG. 1, 100; FIG. 2, 200). In a second embodiment, gas egress from the top of the rotatable tube (400) may be controlled with a flap valve, or an iris valve, while gas egress from the bottom may be controlled by suitable placement of a plunger rod used to load molds (FIG. 1, 100; FIG. 2, 200) into the rotatable tube (400).

The walls of the hermetically sealed housing (1305) may be made of any material. In one embodiment, the walls of the housing (1305) may be made of glass thus providing for the introduction of actinic radiation to the system through the glass walls.

In another exemplary embodiment, the walls of the housing (1305) may be made of a rigid material such as metal. The use of a precision-formed metal housing provides for a secure and accurate stand-alone spin tube housing. The use of such a housing and spin tube combination facilitates the quick change over of spin tubes for maintenance without requiring re-alignment of the spin tubes upon reinstallation. The walls of the housing (1305) may further include windows for the transmission of actinic radiation to the system. The window may be coated with an anti-reflection material in order to minimize radiation losses via surface reflections within the housing (1305). In another exemplary embodiment, specific anti-reflection coatings may be used to optimize the transmission of particular wavelengths of radiation while reducing the transmission of others.

Drive System for Contact Lens Manufacturing System

The rotatable tube (400) may be provided with a means for facilitating smooth rotation accurately about the longitudinal axis while minimizing any movement off axis, thus allowing the accurate concentric rotation of the molds (FIG. 1, 100; FIG. 2, 200) contained within the rotatable tube (400) about the longitudinal axis. This may be achieved by any means known in the art. For example, smooth longitudinal rotation may be achieved by engagement means (1320) such as, for example, bearings mounted on the bearing mounting zones (600) of the rotatable tube (400). Preferably, the engagement means (1320) engage the rotatable tube (400) through a wall of the housing (1305) so as to fully enclose the curing zone (610) of the rotatable tube (400).

The drive zone (620) may be disposed at the bottom end of the rotatable tube (400), and may be located exterior to the housing (1305). A drive system (1340) may be provided within the drive zone (620) in order to rotate the rotatable tube (400). In one exemplary embodiment, the drive system (1340) may include a drive pulley coupled to an electric motor via a chain or belt drive. Preferably, the drive pulley may be larger in diameter than the rotatable tube (400), and may be constructed from a high-density material so as to increase the moment of inertia of the rotatable tube assembly, thus providing for a more uniform angular velocity.

In another exemplary embodiment, the drive pulley may be provided with circumferential magnets, so as to magnetically couple the drive pulley with a second driven pulley, thus allowing the mechanical separation of the rotatable tube (400) and the drive motor. By this means, the rotatable tube (400) can be isolated from any vibrations induced by the drive motor.

In yet another exemplary embodiment, and as depicted in FIG. 13, the rotatable tube (400) may be driven directly. In this embodiment, the drive zone (620) is fitted with a circumferential arrangement of permanent magnets (1325), and a means of assessing the angular velocity of the rotatable tube (400) such as a Hall Effect transducer (1345). The Hall Effect transducer (1345) determines the power dissipated to the drive system (1340) by sensing the current provided to a load and using the device's applied voltage as a sensor voltage. The permanent magnets (1325) may be surrounded by a circular arrangement of drive coils (1330). Direct current may be provided to each drive coil (1330) sequentially, thus providing a brushless direct current motor. The timing of the provision of current to each coil (1330) is provided electronically by the Hall Effect transducer (1345), thus allowing for a highly accurate angular rotation.

Sources of Actinic Radiation for Contact Lens Manufacturing System

The housing (1305) surrounding the rotatable tube (400) may be provided with a means for illuminating the contents of the rotatable tube (400) with actinic radiation. The means of illumination may be held within the housing (1305), or external to the housing (1305), and can comprise any means of providing actinic radiation at a desired wavelength uniformly over the length of the aperture-containing curing zone (610) of the rotatable tube (400).

Generally, there may be provided a number of actinic radiation sources (1350) for producing actinic radiation. Examples of actinic radiation sources (1350) may be UV LED arrays, fluorescent tube lamps, or mercury discharge lamps. In embodiments where the actinic radiation sources (1350) are located in the interior of the housing (1305), the actinic radiation may be directly provided to the polymerizable liquid contained within the individual molds (FIG. 1, 100; FIG. 2, 200) located within the rotatable tube (400).

In embodiments where the actinic radiation sources (1350) are external to the housing (1305), the housing (1305) may include means for the transmission of actinic radiation such as quartz or borosilicate glass windows. In one exemplary embodiment, the windows may be anti-reflection coated in order to minimize radiation losses via surface reflections. In another exemplary embodiment, specific anti reflection coatings may be used to optimize the transmission of particular wavelengths of radiation while reducing the transmission of others.

In yet another exemplary embodiment, various combinations of radiation and radiation filters may be used in conjunction with each other to alter or amend various properties of the radiation entering the rotatable tube (400), and thus change the polymerization conditions within the rotatable tube (400). The use of the various combinations of radiation and radiation filters may be effected throughout the entire process or may be used judiciously at desired times throughout the manufacturing process.

In an exemplary embodiment, the use of high mass materials may be used to facilitate a structurally robust housing (1305) and robust rotating members that are less affected by drive born vibrations or rotational fluctuations. In the present system, it is preferred that both rotational stability (in all axes) and vibrational isolation are optimized during the spinning process. Further, the rotatable tube (400), housing (1005), and drive may be constructed in a modular fashion so as to allow for easy replacement and maintenance.

In another exemplary embodiment, the arrangement of a number of rotatable tubes (400) within a single rigid housing (1305) is possible. Arranging a number of rotatable tubes (400) within a housing (1305) facilitates a greater level of productivity without sacrificing accuracy within each rotatable tube (400). Well-known and standard means of inter tube spacing and part loading can be encompassed as part of the overall production process.

Retention of Molds in the Curing Zone

Figure 14:
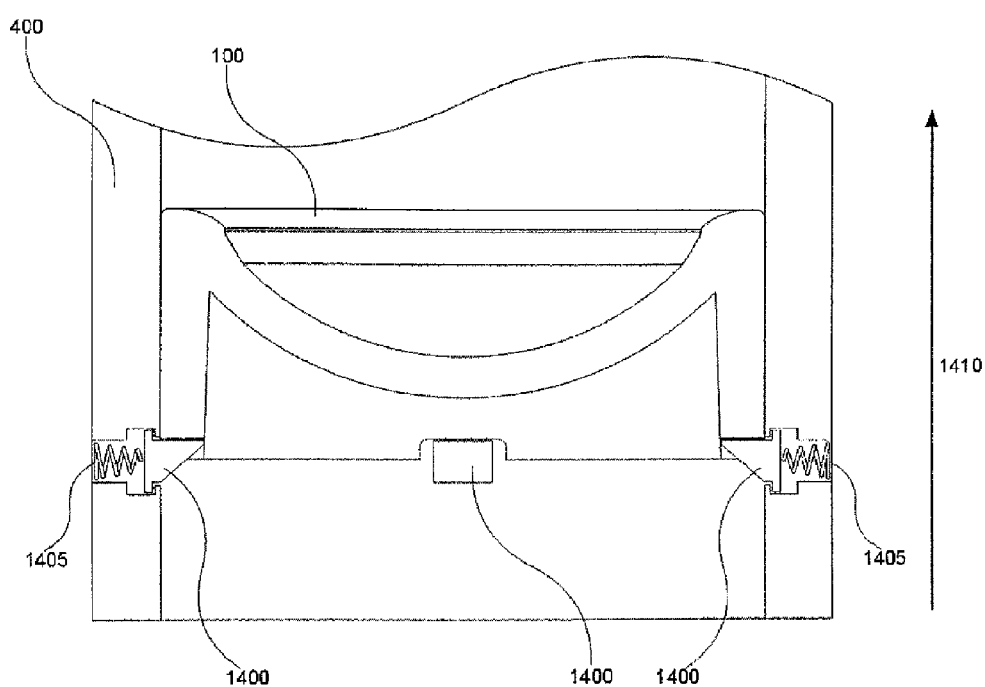
FIG. 14 is a cross-sectional view of a rotatable tube including mold retention means according to an embodiment of the present exemplary system and method.

FIG. 14 is a cross-sectional view of a rotatable tube (400) including mold retention means according to an embodiment of the present exemplary system and method. The molds (FIG. 1, 100; FIG. 2, 200) may be held within the curing zone (FIG. 6, 610) by a variety of means. In one embodiment, the molds, (FIG. 1, 100; FIG. 2, 200) may be constructed of such a dimension so as to produce an interference fit with the inner wall of the rotatable tube (400), and may be held in place by frictional forces, as discussed above.

Alternatively the molds (FIG. 1, 100; FIG. 2, 200) may be held in place by an active mechanical means. In one embodiment, the molds (FIG. 1, 100; FIG. 2, 200) may be introduced into the lower end of the rotatable tube (400) in the direction of arrow (1410) using a pusher rod. The molds (FIG. 1, 100; FIG. 2, 200) may be pushed past a number of pre-loaded retention dogs (1400). These retention dogs (1400) are disposed so as to allow passage of the molds (FIG. 1, 100; FIG. 2, 200) in an upwards direction, but once a mold (FIG. 1, 100; FIG. 2, 200) is clear of the retention dogs (1400), a number of springs (1405) may provide sufficient force to cause the retention dogs (1400) to move radially inwards, where they form a seat on which the last introduced mold (FIG. 1, 100; FIG. 2, 200) sits, thus holding the molds (FIG. 1, 100; FIG. 2, 200) within the curing zone (610). In one embodiment, the molds (FIG. 1, 100; FIG. 2, 200) may include a number of engagement apertures or gas diffusion apertures (FIG. 1; 130) which may be provided so that the retention dogs (1400) may engage the molds (FIG. 1, 100; FIG. 2, 200) and secure the molds (FIG. 1, 100; FIG. 2, 200) in both the horizontal and vertical directions. This may ensure that the molds (FIG. 1, 100; FIG. 2, 200) may remain in a fixed position with respect to the rotatable tube (400). In yet another embodiment, the engagement apertures (FIG. 1; 130) may fully surround the retention dogs (1400) such that the engagement apertures (FIG. 1; 130) are not open at the bottom of the molds (FIG. 1, 100; FIG. 2, 200). This may help to further secure the molds (FIG. 1, 100; FIG. 2, 200) within the rotatable tube (400). As mentioned above, the rotatable tube (400) may include a number of retention dogs (1400) to secure every mold (FIG. 1, 100; FIG. 2, 200) in a fixed position within the rotatable tube (400).

In another embodiment, there may be provided retention dogs (1400) at the lower end of the rotatable tube (400) so as to provide a seat for the last mold (FIG. 1, 100; FIG. 2, 200) introduced into the rotatable tube (400). Thus, only the bottom mold (FIG. 1, 100; FIG. 2, 200) will mechanically engage with the rotatable tube (400). The remaining engagement apertures (FIG. 1; 130) may be used to allow for diffusion of gas throughout the rotatable tube (400) and between the number of molds (FIG. 1, 100; FIG. 2, 200).

The molds (FIG. 1, 100; FIG. 2, 200) may be introduced individually, or as a stacked column of molds. In yet another embodiment, the pusher rod itself may serve as the means for holding the molds (FIG. 1, 100; FIG. 2, 200) within the curing zone (610) of the rotatable tube (400). This can prove to be advantageous in terms of process time and simplicity as well as simplicity in the manufacturing, use and maintenance of the contact lens manufacturing system (FIG. 13, 1300).

Exemplary Operation

In one preferred mode of operation, inert gas is passed into the housing (1005) via the gas inlet ports (FIG. 13, 1310). The molds (FIG. 1, 100; FIG. 2, 200), dosed with a polymerizable liquid, are then introduced into the stationary rotatable tube (400) through the lower end using a pusher rod. The molds are either introduced individually or as a stacked column. The pusher rod lifts the molds past the retention dogs (FIG. 13, 1300) and is then withdrawn. The lowest mold in the stack of molds then sits on the retention dogs (FIG. 13, 1300). The drive mechanism for the rotatable tube (FIG. 4, 400; FIG. 7, 700; FIG. 8, 800; FIG. 9, 900) is then turned on, and the rotatable tube (400) is then rotated at a predetermined speed. In this state, the centrifugal force created by the rotation of the rotatable tube (400) acts upon the polymerizable liquid, pushing it out towards the edges of the molding cavity (FIG. 1, 120) of each mold (FIG. 1, 100; FIG. 2, 200). The rotatable tube (400) is rotated at this predetermined speed for a period of time to allow the concave surface (produced by the combination of factors such as speed of rotation, surface tension of the polymerizable liquid, and acceleration due to gravity) to reach its equilibrium shape. At this point, the column of molds (FIG. 1, 100; FIG. 2, 200) is illuminated by actinic radiation thus initiating its polymerization and formation of the solid article. At completion of the curing process, the actinic radiation is extinguished and the rotation of the rotatable tube (400) is stopped. The cured molds (FIG. 1, 100; FIG. 2, 200) can then be removed by raising the pusher rod and pushing the cured molds (FIG. 1, 100; FIG. 2, 200) from the top of the rotatable tube (400) for collection.

While the use of metal rotatable tubes has been proposed for the spin casting of contact lenses (See, for example, the '138 patent), it is apparent that such tubes would preclude the use of ultraviolet light (or other similar radiation) to initiate polymerization. However, by adopting the simple expedient of placing apertures into the walls of the rotatable tube, it has proved possible to produce robust equipment for the manufacture of high quality contact lenses. The shape and disposition of the apertures is selected to optimize light transmission into the tube, while maintaining a physically robust structural form. The apertures also allow for rapid and homogenous gas exchange from the contact lens molds so as to provide an inert atmosphere above the polymerizable liquid, thus reducing the deleterious effects of oxygen inhibition.

The design of rotatable tube described herein, particularly when coupled to an outer casing provides for an easily interchangeable, mechanically robust apparatus for the spin casting of rotationally symmetric objects such as contact lenses, which requires very little or no maintenance in use.

Multi-Stage Curing

Figure 15:
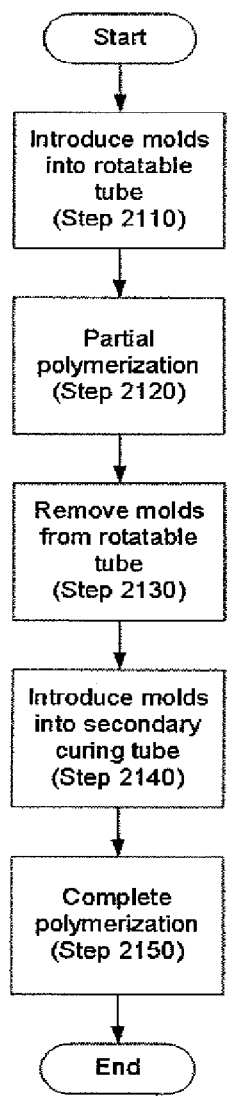
FIG. 15 is a flow chart of a multi-stage curing process according to an embodiment of the present exemplary system and method.

FIG. 15 is a flow chart of a multi-stage curing process according to an embodiment of the present exemplary system and method. After curing or partial curing of the polymerizable liquid, the molds may then be pushed upwards using the pusher rod into a secondary curing device placed on top of the rotatable tube (400). Alternatively, the molds may be offloaded manually, or by a robot arm. The secondary curing device may then further cure the polymerizable liquid contained within the molds. The secondary curing device may be any device traditionally employed. For example, the secondary curing device may be a traditional glass tube.

Turning now in more detail to FIG. 15, in one embodiment, the molds containing the polymerizable liquid may be introduced to the rotatable tube (400) as described above (Step 2110). Next, a partial curing of the lens polymer via illumination by actinic radiation takes place within the rotatable tube (400), thereby initiating its polymerization and partial formation of the solid article (Step 2120). Therefore, according to this exemplary embodiment, the initial cross-linking of the lens may be performed within the curing zone (FIG. 6, 610) of the rotatable tube (400).

During the initial stages of the curing of the lens, the polymer is most susceptible to the introduction of imperfections in the surface of the resulting lens. Vibrations resulting in movement of the mold or standing waves, which produce poor optics, occur when the lens material is most fluidic. Consequently, according to one exemplary embodiment, a lens is partially formed within the curing zone (FIG. 6, 610) of the rotatable tube (400) to a degree where the shape of the contact lens is established and stable. The lens and lens mold combination is then transferred to a traditional glass tube or another less controlled environment for final curing. That is, according to this exemplary embodiment, in order to assure that vibrations and run-out are minimized, the lens is initially rotated, illuminated, and cross-linked in the controlled environment of the rotatable tube (400) as taught herein. Specifically, the tighter tolerances of the present exemplary rotatable tube (400) along with the other features including, but in no way limited to, reduced run-out and de-coupled magnetic drive, result in an initial form of the lens with minimal surface aberrations.

Returning now to FIG. 15, with the shape and surface area of the lens established, the partially formed lens may be transferred from the rotatable tube (400) to a secondary curing tube (Steps 2130 and 2140), where the partially formed lens may be fully cured (Step 2150). The curing of the lens may be concluded in the secondary curing tube via any means including, but in no way limited to, photochemical or thermal induced polymerization. Further, in another exemplary embodiment, the second stage curing of the partially formed lens may occur in a suitably controlled tunnel oven which may finalize the curing of the lens via either actinic radiation, heat, or both. Once an initial amount of cross-linking has occurred via actinic radiation within the rotatable tube (400), the partially cross-linked lens polymer has sufficient structural stability to be less affected or entirely unaffected by rotation in the secondary curing tube or through introduction to the above-mentioned tunnel oven or other curing device.

Further, through the employment of the above-described multi-stage curing process, the time required to produce a fully cured article may be significantly reduced. The time required to partially cure an article within the rotatable tube (400) may take only a short amount of time. Through simple division of resources, the time required to produce a finished article may divided between the first partial curing stage using the rotatable tube (400) and the second fully curing stage using the secondary curing tube. Still further, multiple secondary curing tubes may be provided to allow even more articles partially cured within the rotatable tube (400) to be fully cured in the multiple secondary curing tubes.

The preceding description has been presented only to illustrate and describe embodiments and examples of the principles described. This description is not intended to be exhaustive or to limit these principles to any precise form disclosed. Many modifications and variations are possible in light of the above teaching.

The invention claimed is:

1. An apparatus for spin casting lenses, comprising:
a rotatable tube having a first end and a second end connected by a longitudinal surface that defines an interior longitudinal cavity configured to receive at least one contact lens mold; and
an actinic radiation source disposed adjacent to the rotatable tube;
wherein the rotatable tube includes at least one portion defining at least one aperture, wherein the at least one aperture extends through the longitudinal surface of the rotatable tube to the interior longitudinal cavity, wherein the at least one aperture is configured to permit the transmission of actinic radiation from the actinic radiation source into the interior longitudinal cavity during rotation of the tube, wherein the at least one portion is at least partially made of a material that is opaque to actinic radiation.

2. The apparatus of claim 1, wherein the material of the rotatable tube that is opaque to actinic radiation is made of a metal.

3. The apparatus of claim 2, wherein an internal bore of the rotatable tube defined by the longitudinal cavity is configured to reflect actinic radiation.

4. The apparatus of claim 1, wherein the aperture is of a shape selected from the group consisting of a diamond, a circle, a square, a rectangle, and an oval.

5. The apparatus of claim 1, wherein the aperture tapers from the internal bore to the outside surface of the rotatable tube.

6. The apparatus of claim 5, wherein the aperture is configured to diffract actinic radiation entering the rotatable tube.

7. The apparatus of claim 1, further comprising a first bearing mounting zone formed on the first end of the rotatable tube and a second bearing mounting zone formed on the second end of the rotatable tube;
wherein the first bearing mounting zone and the second bearing mounting zone are each constructed of a non-brittle material that is opaque to actinic radiation.

8. The apparatus of claim 1, further comprising a glass housing surrounding the rotatable tube, wherein the glass housing is transparent to actinic radiation.

9. The apparatus of claim 8, further comprising an anti-reflection coating formed on the glass housing.

10. A system for spin casting a lens comprising:
a first curing device in the form of a rotatable tube, the rotatable tube having a first end and a second end connected by a longitudinal surface that defines an interior longitudinal cavity configured to receive at least one contact lens mold, wherein the rotatable tube includes at least one portion defining at least one aperture, wherein the at least one aperture extends through the longitudinal surface of the rotatable tube to the interior longitudinal cavity, wherein the at least one aperture is configured to permit a transmission of actinic radiation from an actinic radiation source into the interior longitudinal cavity during rotation of the tube, wherein the at least one portion is at least partially made of a material that is opaque to actinic radiation; and wherein the rotatable tube is configured to partially cure a polymerizable liquid contained in the at least one contact lens mold; and
at least one second curing device, the at least one second curing device being configured to finalize the curing of the polymerizable liquid contained in the at least one contact lens mold.

11. The system of claim 10, further comprising:
a drive configured to rotate the rotatable tube such that the polymerizable liquid contained within the at least one contact lens mold forms a concave shape; and
an actinic radiation source disposed adjacent to said rotatable tube.

12. The system of claim 11, wherein the rotatable tube further comprises a first bearing mounting zone formed on the first end of the rotatable tube and a second bearing mounting zone formed on the second end of the rotatable tube;
wherein the first bearing mounting zone and the second bearing mounting zone are each constructed of a non-brittle material that is opaque to actinic radiation.

13. The system of claim 11, wherein said drive further comprises:
at least one magnet circumferentially arranged around a portion of the rotatable tube;
at least one drive coil circumferentially arranged around a portion of the magnet; and
a motor electrically coupled to the drive coil.

14. The system of claim 13, further comprising a Hall Effect transducer electromagnetically coupled to the drive coil and configured to determine the angular velocity of the first rotatable tube.

15. The system of claim 11, wherein the actinic radiation source comprises one of a UV LED, a fluorescent tube lamp, or a mercury discharge lamp.

16. The system of claim 15, wherein said first curing device further comprises a housing;
   wherein said rotatable tube and said actinic radiation source are hermetically sealed within said housing.

17. The system of claim 11, further comprising a glass housing surrounding the rotatable tube, wherein the glass housing is transparent to actinic radiation.

18. The system of claim 17, further comprising an anti-reflection coating formed on the glass housing.

* * * * *